No. 892,772.

PATENTED JULY 7, 1908.

C. H. TAYLOR.
HYDRAULIC AIR COMPRESSOR.
APPLICATION FILED MAY 9, 1904.

4 SHEETS—SHEET 2.

No. 892,772.　　　　　　　　　　　　　　　　　PATENTED JULY 7, 1908.
C. H. TAYLOR.
HYDRAULIC AIR COMPRESSOR.
APPLICATION FILED MAY 9, 1904.

4 SHEETS—SHEET 4.

Witnesses
Alex Currie
Arthur H. Evans

Inventor
Charles H. Taylor
By Attorney
John W. Swan

UNITED STATES PATENT OFFICE.

CHARLES HAVELOCK TAYLOR, OF WESTMOUNT, QUEBEC, CANADA, ASSIGNOR TO THE TAYLOR HYDRAULIC AIR COMPRESSING COMPANY LIMITED, OF MONTREAL, CANADA.

HYDRAULIC AIR-COMPRESSOR.

No. 892,772.　　　　　Specification of Letters Patent.　　　Patented July 7, 1908.

Application filed May 9, 1904. Serial No. 207,148.

*To all whom it may concern:*

Be it known that I, CHARLES HAVELOCK TAYLOR, of the city of Westmount, in the district of Montreal, Province of Quebec, Canada, have invented certain new and useful Improvements in Hydraulic Air-Compressors; and I do hereby declare that the following is a full, clear, and exact description of the same.

My invention relates particularly to the means for automatically governing the amount of air compressed in relation to that consumed.

It also relates to the regulation of the air and water intakes and to the construction of the compression chamber.

The invention has for its object to cause the compressor to automatically control itself, to enable it to be started and stopped at will, to provide means whereby the intake of water and air can be adjusted to a predetermined standard of work to be done and the compressor regulated to work at such a standard uniformly.

The invention further has for its object, to facilitate the building of the plant and reduce the cost thereof.

The invention may be said briefly to consist of a floatable member adapted to control the intake of water and air and including means whereby the volume of water and air received by the compressor can be adjusted to a predetermined standard of work to be done, this adjusting means being adapted to regulate the compressor to work at such standard uniformly.

The invention also includes a compressing chamber of the type comprising a stand pipe down which the air charged water is taken, an uptake pipe for the air, and a separate up-take for the water, the up-takes being located some distance from the stand pipe and communicating therewith through a tunnel. The novel feature of this tunnel is a substantially uniformly horizontal roof through which the lower end of the stand pipe projects downwardly to within a short distance of the bottom of the tunnel which constitutes the compression chamber, such compression chamber increasing in depth from its receiving to its discharge end. A diagonal boring extends from the compression chamber to the water uptake shaft, and the compressed air conductor and main blow off pipe are taken from the compression chamber through this boring and the water uptake shaft to the surface of the ground.

Figure 1:
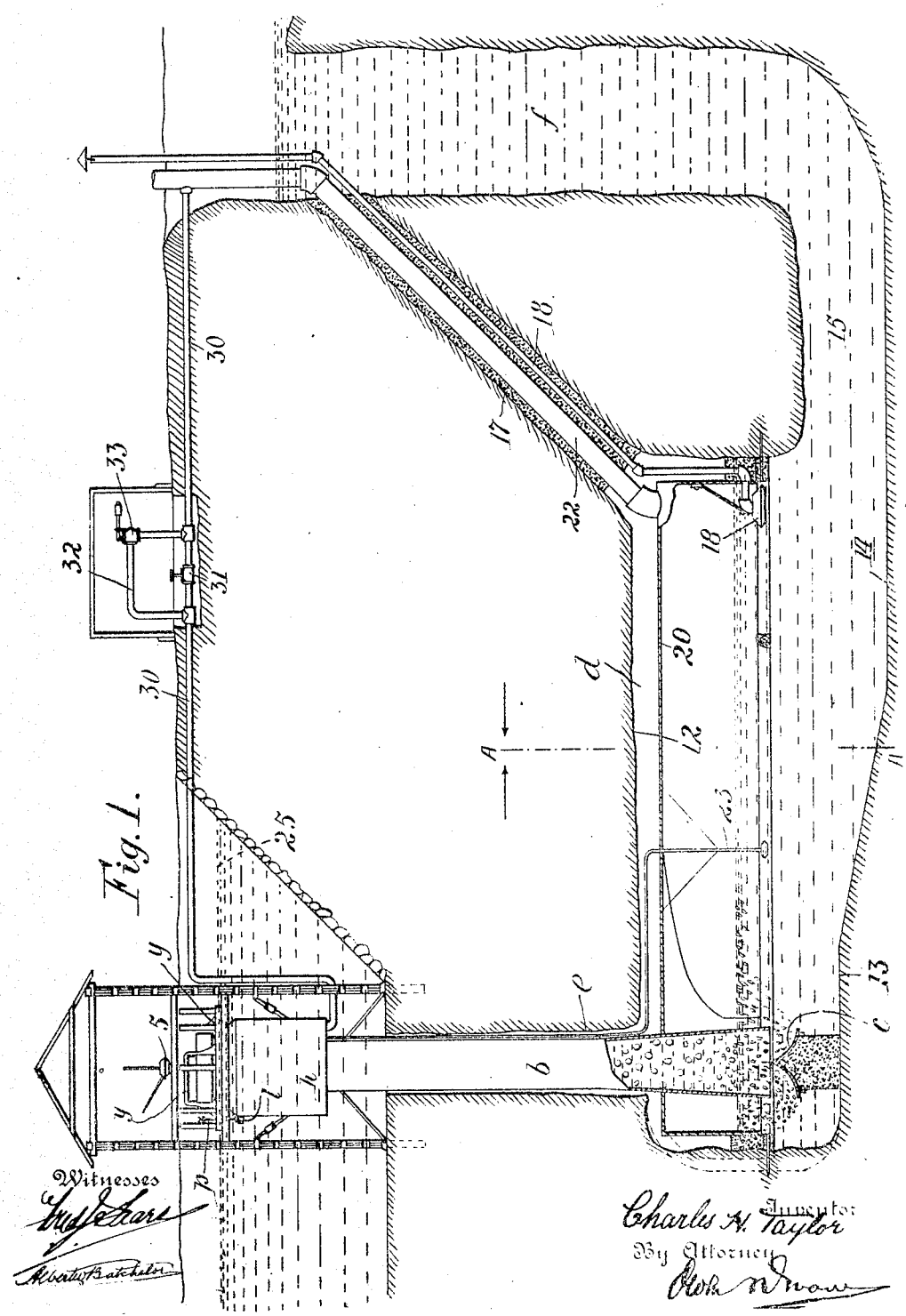
Figure 2:
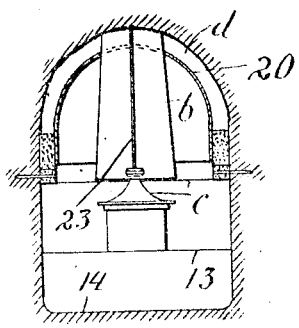
Figure 3:
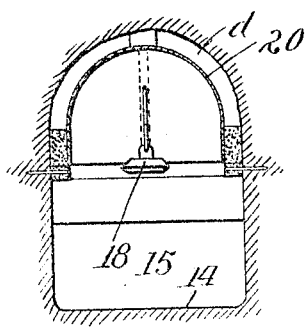
Figure 4:
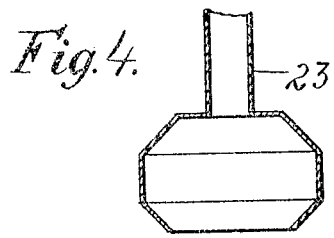
Figure 5:
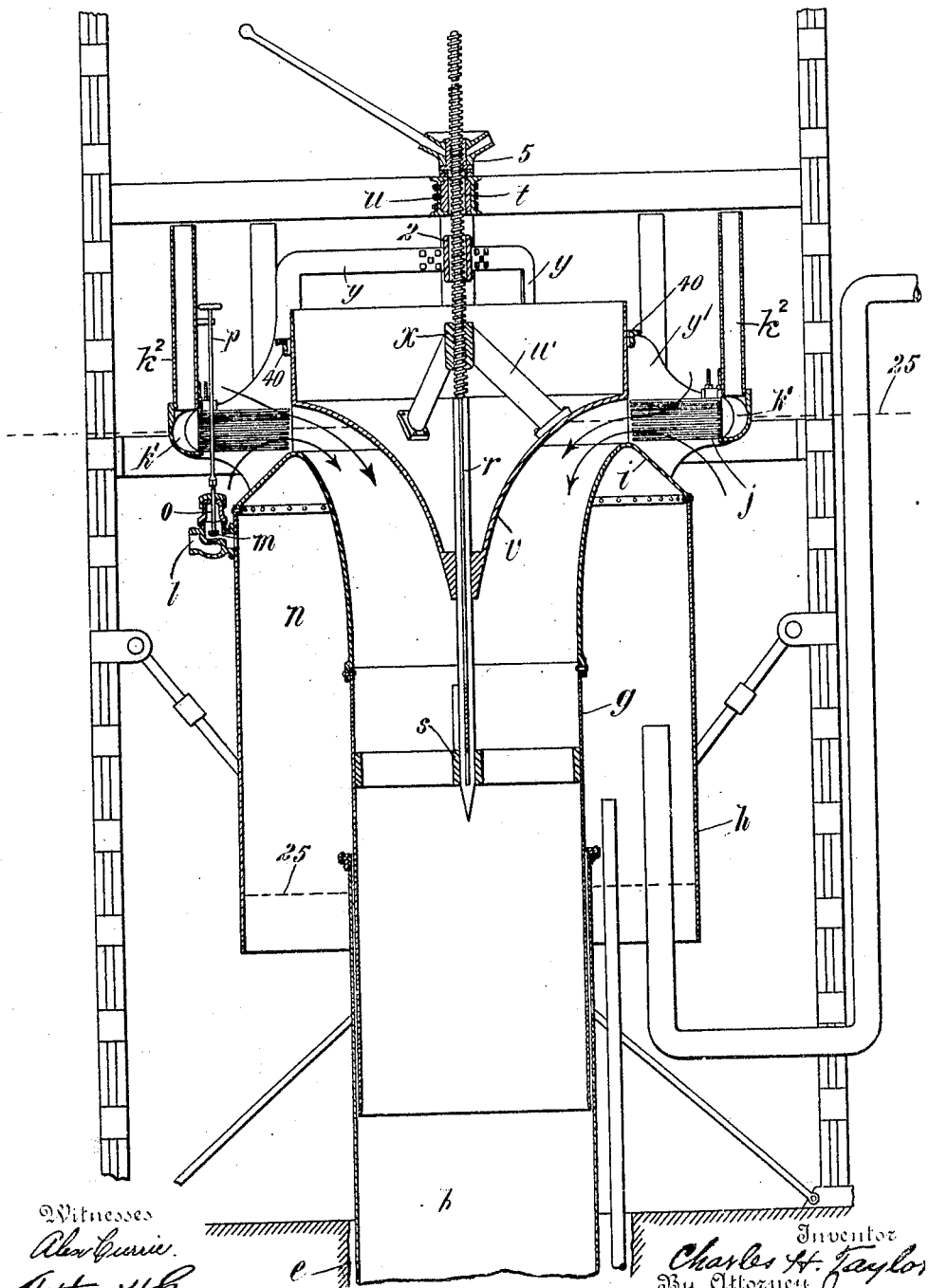
Figure 6:
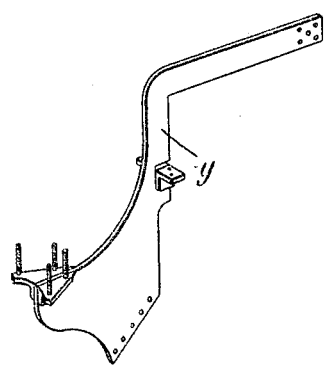
Figure 7:
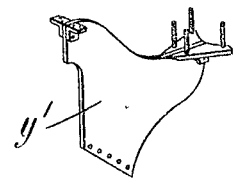
Figure 8:
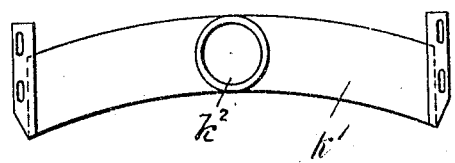
Figure 9:
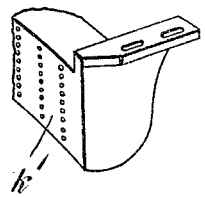

For full comprehension, however, of my invention reference must be had to the accompanying drawings forming a part of this specification wherein like symbols indicate corresponding parts and in which, Figure 1 is a longitudinal vertical sectional view of a plant constructed according to my invention; Fig. 2 is a transverse vertical sectional view taken on line A A Fig. 1 looking towards the intake of the compression chamber; Fig. 3 is a similar view to Fig. 2 looking towards the outtake end of the compression chamber; Fig. 4 is a detail sectional view of the auxiliary blow-off; Fig. 5 is an enlarged vertical sectional view of my improved floatable member adjusted to float with one half only of the air intake pipes immersed; Figs. 6 and 7 are perspective views of parts of the means for centralizing the floatable member; Fig. 8 is a plan view of one section of the annular air chamber; and Fig. 9 is a perspective view of one end thereof with the horizontal air tubes removed.

The stand pipe $b$, spreader $c$, compression chamber $d$ (of the tunnel type), and the downtake and uptake shafts $e$ and $f$ respectively, communicating with opposite ends of the tunnel, are in the main of the type disclosed in applications previously filed by me.

My improved floatable member consists of a short length $g$ of pipe adapted to fit slidably into the upper end of the stand pipe $b$ and has a cylindrical section $h$ of greater diameter encircling same and connected thereto at its upper end by a dome-like annular top which constitutes the edge of the mouth or intake end of the stand pipe the pipe $g$, cylindrical section $h$, and top $i$ constituting an annular air containing chamber or float $n$. This chamber acts as a support for the air intake devices consisting of a plurality of tubes $j$ (see Fig. 5), communicating with an annular air chamber of peculiar specific construction made up of a series of independent sections $k'$ (shown clearly in Figs. 3, 6, and 7) and forming together with other features herein disclosed and not claimed the subject matter of an application filed by me May 7, 1904 under Serial No. 206,957. Vertical pipes $k^2$ communicate at their lower ends with the sections $k'$ and have their upper ends open to the atmosphere.

A vent tap $l$ controlled by a valve $m$, communicates with the upper end of the chamber n and the upper end of the stem o thereof is square to receive the square socket at the lower end of a key p.

A spindle r, having its upper half screw-threaded, is braced and guided at its lower end by a spider s secured to the inside of the short length of pipe, g, and is supported at its upper end by a nut 5 resting upon a girder u (forming a part of the structure) having a vertical passage t in which the upper portion of spindle r is guided. A conical valve v, is suspended by a spider w through which the spindle is threaded, and the purpose thereof is to control the amount of air taken from the tubes j, and, at the same time, the volume of water admitted to the stand pipe.

The chamber n and the parts carried thereby are guided in their movement and centralized and braced by a series of hanger bars y connecting the top thereof to a sleeve 2 mounted slidably upon the spindle between the last mentioned spider and the girder, and a series of webs y' alternate with the hanger bars y, are connected between the said top of the chamber n and a ring 40 slidably encircling the upper portion of the valve.

My improved compression chamber d is of the tunnel type, and according to my present invention the roof 12 thereof is uniformly horizontal throughout, while the portion 14 of the bottom adjacent to the outlet end of the chamber is at a lower level than the portion 13 which is beneath the stand pipe. This tunnel has an extension 15 which is connected to the uptake shaft f leading to the tail water level, and a diagonal boring 17 leads from the end of the upper portion of the tunnel to the last mentioned vertical shaft.

A main blow off 13 leads from a point on a level slightly above the lower end of the stand pipe through the diagonal boring 17 and up the vertical shaft f, to the atmosphere, its upper end being open.

I prefer to provide my improved tunnel proper with a metallic lining 20 into the lower portion of the discharge end whereof I extend the lower end of the main blow off, and to the top of which I connect the lower end of the compressed air duct 22 and take such duct through the diagonal boring and up the said last mentioned shaft to any desired point for consumption or distribution.

My improved floating member constitutes a controller and in order to cause the compressor to, through the medium thereof, automatically control itself I take an auxiliary blow-off pipe 23 from a point within the compression chamber a short distance above the main blow off, upwardly through the top of the metallic lining and up the stand pipe shaft to the interior of the chamber n, and take a pipe 30 from the compressed air duct 22 above the surface of the ground to within close proximity to the chamber n and downwardly around the lower edge of the outer wall h thereof to the interior. This pipe is controlled by a valve 31, and a by-pass branch 32 leads from one side of valve 31 to the other, and is provided with a safety valve 33. The spreader c is, as before mentioned, of the type usually employed by me, and located beneath the stand pipe.

The operation of my improved air compressor is as follows:—To start the compressor the floatable member is first lowered into operative position by turning nut 5 thereby immersing the horizontal air tubes, (the level of the water being indicated at 25). Before starting, the valve 31 is opened sufficiently to allow enough air to flow from storage to chamber n to float the latter and support the air intake tubes j above the water level. The valve m of vent l is then adjusted to retard the escape of air from chamber n sufficiently to float such chamber during the operation of the compressor and consequently support the head piece at a level with the air supplying pipes j or any required number of them immersed in the water. When the amount of air being compressed exceeds the consumption (and the escape at l,) an excessive pressure occurs in the compression chamber 20 which lowers the level of the water in such chamber until the compressed air is admitted to the auxiliary blow off 23 through which it flows to chamber n thereby raising the latter and lifting the tubes j or some of them out of the water. The supply of air is thus partially or fully automatically shut off according to the number of the said tubes lifted out of the water while the water continues to flow through the apparatus. The tubes j will remain raised in this manner until some air has been drawn from the compression chamber, when they will again sink to operative position.

To stop the operation of the compressor at any time the valve m is closed, to prevent the escape of air from chamber n, and the valve 31 is opened full, thus causing a rush of compressed air from compressed air pipe 22 through pipe 30 into the chamber n and lifting all the air supply tubes j above the water level, thereby stopping the compressor.

To again start the compressor the valve 31 should be closed almost completely and the valve m opened thus allowing the air which causes the head piece to float, to escape and the head piece to again sink. When the latter reaches its proper working position the valve m is again adjusted to retard the escape as before mentioned.

The chamber n, and the air intake devices carried thereby, constitute a floatable head piece.

It is obvious that, constructed as above, the compressor automatically controls itself, it can be started and stopped at will, and it can be manually adjusted to a predetermined standard of work to be done, by moving the supporting nut along the spindle and consequently either varying the capacity of the mouth of the stand pipe or lifting the air intake tubes out of the water, and by the adjustment of valve m the compressor can be caused to work at such standard uniformly.

What I claim is as follows:—

1. In an hydraulic air compressor the combination with a stand pipe, air intake devices and a chamber in which the compressed air is accumulated, of a floatable member carrying the intake devices, a valve controlled duct leading from the compressed air chamber to the floatable member such member having a valve controlled vent.

2. In an hydraulic air compressor, the combination with a stand pipe, a compression chamber with which the lower end of said stand pipe communicates, a water conductor and a compressed air conductor both leading from said compression chamber, of a floatable head piece vertically movably supported upon the top of such stand pipe and having a vent tap for controlling the escape of air therefrom, and a valve controlled duct communicating at one end with a part of the compressor containing air compressed thereby and at its other end with the air chamber of such floatable head piece.

3. In an hydraulic air compressor the combination with a stand pipe, and a chamber in which the compressed air is accumulated, of a floatable head piece carrying air intake devices and constituting the upper end of the stand pipe, a valve controlled duct leading from the compressed air chamber to the head piece, and means for regulating the amount of air retained in the head piece for the purpose of varying the line of flotation of the head piece and the level of the air intake devices.

4. In an hydraulic air compressor, the combination with a stand pipe, a compression chamber with which the lower end of the stand pipe communicates, a water conductor and a compressed air conductor both leading from the compression chamber, of a floatable head piece vertically movably supported upon the top of such stand pipe and means whereby the compressed air contained in the compression chamber is caused to support the head piece in working position and means upon the operation whereof the compressed air causes the head piece to be moved from its working position thereby arresting the operation of the compressor.

5. In an hydraulic air compressor, the combination with a stand pipe, a compression chamber with which the lower end of the stand pipe communicates, a water conductor and a compressed air conductor both leading from said compression chamber, of a floatable head piece located at the top of the stand pipe and having an air vent; a valve controlled air supply to the head piece and means for controlling the escape of air through the vent.

6. In an hydraulic air compressor, the combination with a stand pipe, a compression chamber with which the lower end of said stand pipe communicates, a water conductor and a compressed air conductor both leading from said compression chamber, of a floatable head piece vertically movably supported upon the top of such stand pipe and having a vent tap for controlling the escape of air therefrom, and a valve controlled communicating duct communicating at one end with a part of the compressor containing air compressed thereby and at its other end with the air chamber of such floatable head piece.

7. In an hydraulic air compressor, the combination with a stand pipe, a compression chamber with which said stand pipe communicates, a water conductor and a compressed air conductor both leading from said compression chamber, of a floatable head piece vertically movably supported upon the top of such stand pipe and consisting of an air chamber one of the walls whereof has a water intake formed thereon and the air intake ducts supported thereon, a vent tap upon one of the walls of such chamber for controlling the escape of air therefrom and an air conducting pipe leading from a point within the compression chamber at a level at which it is desired to check the lowering of the surface of the water, to the interior of the air chamber of the head piece.

8. In an hydraulic air compressor, the combination with a stand pipe, a compression chamber with which said stand pipe communicates, a water conductor and a compressed air conductor both of said conductors leading from said compression chamber, of a floatable head piece vertically movably supported upon the top of such stand pipe and consisting of an air chamber comprising a length of pipe of slightly less diameter than and fitting slidably into the upper end of such stand pipe, a cylindrical section of larger diameter than and inclosing such pipe length and an annular top plate connected at its edges to such pipe length and upper end of the cylindrical section, such cylindrical section having an escape for air therefrom, an air conducting pipe leading from a point within the compression chamber at a distance from the top thereof to the interior of such cylindrical section, and a series of air ducts carried by the head piece and each having one end communicating with the atmosphere and its other end in close proximity to the passage through the pipe length, for the purpose set forth.

9. In an hydraulic air compressor, the combination with a stand pipe, a compression chamber with which said stand pipe communicates, a water conductor and a compressed air conductor both of said conductors leading from said compression chamber, of a floatable head piece vertically movably supported upon the top of such stand pipe and consisting of an air chamber and comprising a length of pipe of slightly less diameter than and fitting slidably into the upper end of such stand pipe, a cylindrical section of larger diameter than and inclosing such pipe length and an annular top plate connected at its edges to such pipe length and upper end of the cylindrical section, such cylindrical section having a valve controlled escape for air therefrom, a valve controlled pipe leading from a point within the compression chamber at a distance from the top thereof to the interior of such cylindrical section, and a series of air ducts carried by the head piece and each having one end communicating with the atmosphere and its other end in close proximity to the passage through the pipe length, for the purpose set forth.

10. In an hydraulic air compressor, the combination with a stand pipe and a head piece upon the upper end of said stand pipe and having a water intake and a series of air ducts communicating at one end with the atmosphere and projecting at their other ends into said water intake of a vertical spindle having its upper half screw-threaded and supported in said head piece and its upper end projecting above the water intake, a valve for controlling such water intake a nut screwed upon said threaded spindle means connecting said valve to said nut to be rigidly supported thereby, a stationary part adjacent to said spindle above such valve and an adjusting nut threaded upon the upper end of such spindle and adapted to at times rest upon such stationary part.

11. In an hydraulic air compressor, the combination with a stand pipe and a head piece upon the upper end of said stand pipe and having a water intake and a series of air ducts communicating at one end with the atmosphere and projecting at their other ends into said water intake of a vertical spindle having its upper half screw-threaded and supported in said head piece and its upper end projecting above the water intake, a conical valve for controlling such water a nut screwed upon said threaded spindle and means connecting said valve to said nut to be rigidly supported thereby, a stationary part adjacent to said spindle above said valve and an adjusting nut threaded upon the upper end of such spindle and adapted to at times rest upon such stationary part.

12. In an hydraulic air compressor, the combination with a stand pipe, a compression chamber with which said stand pipe communicates, a water conductor and a compressed air conductor both of said conductors leading from said compression chamber, of a floatable head piece vertically movably supported upon the top of such stand pipe and consisting of an air chamber comprising a length of pipe of slightly less diameter than and fitting into the upper end of such stand pipe, a cylindrical section of larger diameter than and inclosing such pipe and an annular top plate connected at its edges to such pipe length and upper end of the cylindrical section, such cylindrical section having a valve controlled escape for air therefrom, an air conducting pipe leading from a point within the compression chamber at a distance from the top thereof to the interior of such cylindrical section, said head piece having a water intake and a series of air ducts communicating at one end with the atmosphere and projecting at their other ends into said water intake a vertical spindle having its upper half screw-threaded and supported in said head piece and its upper end projecting above the water intake, a conical valve for controlling such water intake a nut screwed upon said threaded spindle means connecting said valve to said nut to be rigidly supported thereby, a stationary part adjacent to said spindle above such valve and an adjusting nut threaded upon the upper end of such spindle and adapted to rest upon such stationary part.

13. In an hydraulic air compressor, a compression chamber of the "tunnel" type having a uniformly horizontal roof, an up-take shaft having its lower end adjacent to one end of said compression chamber, said compression chamber communicating with the lower end of said shaft, a stand pipe having its lower end located within and a distance below the top of the opposite end of said compression chamber, and a compressed air conductor leading from the top of the chamber, substantially as described and for the purpose set forth.

14. In an hydraulic air compressor a compression chamber of the tunnel type, an up-take shaft, an extension leading from the bottom of such compression chamber to the lower end of said shaft, and a diagonal boring leading from the top of the end of the compression chamber adjacent to said shaft to said shaft such diagonal boring accommodating the compressed air conducting pipe for the purpose set forth.

15. In an hydraulic air compressor, a compression chamber of "tunnel" type, a stand pipe having its lower end located in one end of said compression chamber, and an up-take shaft having its lower end located adjacent to the opposite end of said compression chamber, the portion of the floor of said compression chamber in the vicinity of the stand pipe being parallel to the roof thereof and the portion of the floor from within a short distance of said last mentioned portion to the opposite end of the compression chamber being at a lower level than said first mentioned portion, an extension of the lower portion of such compression chamber communicating with the lower end of the up-take shaft and a diagonal cut extending from the top of the last mentioned end of the compression chamber to the up-take shaft for accommodating the compressed air conducting pipe for the purpose set forth.

16. In an hydraulic air compressor, a compression chamber of the "tunnel" type having a uniformly horizontal roof, an up-take shaft having its lower end adjacent to one end of said compression chamber, an extension of the lower end of said compression chamber and communicating with the lower end of said shaft, a metallic lining for the upper portion of said compression chamber, a stand pipe having its lower end located within and a distance from the top of the opposite end of said compression chamber, and a compressed air conductor leading from the top of such lining, substantially as described and for the purpose set forth.

In testimony whereof, I have affixed my signature, in presence of two witnesses.

CHARLES HAVELOCK TAYLOR.

Witnesses:
 WILLIAM P. McFEAT,
 FRED. J. SEARS.